United States Patent [19]
Meigs

[11] Patent Number: 5,451,124
[45] Date of Patent: Sep. 19, 1995

[54] WIRE BRUSH FASTENING DEVICE

[75] Inventor: Richard A. Meigs, East Concord, N.Y.

[73] Assignee: The United States of America as represented by the United States Department of Energy, Washington, D.C.

[21] Appl. No.: 114,050

[22] Filed: Aug. 31, 1993

[51] Int. Cl.⁶ ............................................. F16B 37/16
[52] U.S. Cl. .................... 411/436; 411/433; 411/527; 411/DIG. 1; 411/970; 411/918; 15/160; 73/828
[58] Field of Search ............... 411/512, 432, 433, 436, 411/437, 525, 526, 527, 528, 530, DIG. 1, 970, 999, 918; 15/104.04, 160, 200; 73/831, 828; 482/102, 98, 99, 101

[56] References Cited

U.S. PATENT DOCUMENTS

| Re. 28,066 | 7/1974 | Marcyan | 482/98 |
| 2,197,220 | 4/1940 | Kost | 411/528 |
| 2,404,507 | 7/1946 | Link | 15/160 |
| 2,566,593 | 9/1951 | Bloomfield | 411/432 |
| 2,600,338 | 6/1952 | Starr | 15/160 |

FOREIGN PATENT DOCUMENTS

| 883010 | 11/1961 | United Kingdom | 411/527 |
| 1222916 | 4/1986 | U.S.S.R. | 411/437 |

Primary Examiner—Flemming Saether
Attorney, Agent, or Firm—Tyrone Davis; Hugh Glenn; William R. Moser

[57] ABSTRACT

A fastening device is provided which is a variation on the conventional nut and bolt. The bolt has a longitudinal axis and threading helically affixed thereon along the longitudinal axis. A nut having a bore extending therethrough is provided. The bore of the nut has a greater diameter than the diameter of the bolt so the bolt can extend through the bore. An array of wire bristles are affixed within the bore so as to form a brush. The wire bristles extend inwardly from the bore and are constructed and arranged of the correct size, length and stiffness to guide the bolt within the bore and to restrain the bolt within the bore as required. A variety of applications of the wire brush nut are disclosed, including a bolt capture device and a test rig apparatus.

13 Claims, 6 Drawing Sheets

WIRE BRUSH FASTENING DEVICE

CONTRACTUAL ORIGIN OF THE INVENTION

The United States Government has rights in this invention pursuant to Contract No. DE-AC07-81NE44139 between the United States Department of Energy and West Valley Nuclear Services Co., Inc.

BACKGROUND OF THE INVENTION

The present invention relates generally to fastening devices and more particularly to fastening devices utilizing wire bristles to retain a bolt threaded therethrough.

The use of nuts and bolts as fasten devices is centuries old. An ordinary nut descends down the shaft of a bolt only along the path where the threads of the nut interlock with the threads of the bolt. When an external force (encountered for example at the surface of the fixed-member being bolted into) impedes the ordinary nut's smooth rotation, the nut tightens, descends at a slower pace, and its rotation ultimately stops.

During initial threading an ordinary nut can begin descent down the shaft of a bolt only when its threads are aligned with those of the bolt (within a half-thread). A bolt can thread through an ordinary nut only along the path where their threads interlock.

External threading resistance is typically met when a nut meets the under-surface of a fixed member to which the remote member is being fastened, when a force impinges on the bolt itself, or when a nut meets either a bolt-thread ending or the head of a bolt. Whenever it is met, an ordinary nut reacts to threading resistance by creating tension in the bolt and tightening. The nut descends at a slower pace and eventually stops rotating (unless such a force is applied as to strip the fixed threads).

While these characteristics enable an ordinary nut to perform the fastening function for which it was designed, there are applications where a different type of nut would be beneficial. In certain situations a nut that does not fasten but performs other functions such as bolt guiding or alignment, bolt holding, or force absorbing would be useful.

An additional application of fasteners is for remote assembly of heavy plant equipment in contaminated areas. Upon disassembly of equipment, conventional capture devices provide "capture" of the fastening bolt; the bolt used for fastening is held in place in a remote section and is aligned perpendicular to the remote member's surface (hereafter "vertically"), so that re-fastening to the fixed section is easy when assembly is needed again. Internal threads in the remote member portion of the device in combination with a light-action spring perform the "capture" function. As the bolt is removed from the fixed member, the light-action spring lifts the bolt up and the bolt threads meet the threads inside the remote member portion of the device. The internal remote member threads hold the bolt in place and ensure that it is captured, aligned vertically and ready for refastening.

However, the conventional remote fastening "capture" devices are unnecessarily complicated and costly. Rather than having a straight cylindrical hole through the remote member portion of the device, it has a hole with three different diameters; a wide diameter where the spring sits, a narrow diameter where the internal threads are bored, and another wide diameter. Threads inside the hole are difficult to make and must be bored with the utmost precision. Thus a simpler design would be desirable.

An additional use of fasteners is in load-test rigs used for determining the duty rating of cranes in contaminated areas. One such apparatus consists of twenty-five one-ton steel plates stacked on top of each other. A lifter beam fits through holes at the center of the stacked plates and for each lift, one bolt pin slides under a particular plate depending on the desired load and interlocks with the plate beam.

While use of threaded pins enables precise insertion and easy remote control, there is a problem with the force exerted on the pins. The pins are rotated, and thus inserted or withdrawn using an impact wrench on the head of the bolt. When rotated, the impact wrench exerts 550 foot-pound of torque which can result in tension or compression loads of 100,000 pounds. When an ordinary nut is installed under the plates, the nuts either have to be manufactured to such high standards (along with the bolt threads) as to withstand the force exerted by the impact wrench, or there has to be very precise control over the wrench's rotation. In either case, this is expensive.

SUMMARY OF THE INVENTION

The present invention provides a fastening device which is a variation on the traditional nut and bolt. The present fastening device utilizes a conventional bolt having a longitudinal axis and threads helically affixed thereon. A nut having a bore extended therethrough is also provided. The bore is of a greater diameter than the diameter of the bolt so that the bolt can extend through the bore of the nut. An array of wire bristles are affixed within the bore and extend inwardly therefrom. The bristles are constructed of sufficient length, thickness and strength and are positioned within the bore so as to form a brush which guides the bolt within the bore and selectively restrains the bolt within the nut.

Ordinarily, the bristles extend inwardly no more than one-half of the diameter of the bore. In practice, it is frequently desirable to reduce the length of the bristles to less than one-half of the diameter of the bolt. In a preferred embodiment, the wire bristles are constructed of 14 mil. diameter wire so as to provide sufficient stiffness and at the same time sufficient elasticity to allow threading of the bolt onto the wire bristles. At the same time, the wire bristles are sufficiently rigid so as to selectively retain the nut member on the bolt member. To this end, in a preferred embodiment, the wire bristles are constructed of 300 series stainless steel wire having a modulus of elasticity of 29 million. The helical threading on the bolt preferably has a pitch of between 4–16 per inch so as to insure ease of threading through the wire bristles and at the same time sufficient resistance to passage of the bolt so as to retain the bolt in the nut.

Although the present invention is designed primarily for use with a nut and a bolt, the invention may be adapted for use with any object having a bore extending therethrough. The object or body is an array of wire bristles affixed to and extending radially into the bore. The bristle members are again constructed and arranged to guide the bolt member within the bore and selectively retain the bolt within the apparatus as required. Thus, the requirement for a nut may be eliminated through the use of wire bristles.

In an additional alternative embodiment, the use of wire bristles allows selective attachment or removal of bolts to a plurality of weights called test rig plates stacked on top of each other. A lifter beam having a slot extending therethrough, extends through the test rig plates. A mechanism is provided for elevating and lowering the lifter beam as required. A series of bolts are disposed and extend horizontally from each test rig plate; one for each plate. When the desired number of plates are selected, a particular bolt corresponding to that selection is inserted through the lifter beam into the plate. As a result, the raising of the lifter beam also raises the selected number of test rig plates, as required. Wire bristles are disposed within the test rig plate. The wire bristles within the bore absorb force exerted on the bolt member when the bolt member is fully extended into the bore. In ordinary cases where a nut is used for affixing a bolt to an object, excessive tightening can cause stripping of the threading on the bolt and the nut. In the present case, using wire bristles, this cannot occur. Excessive tightening of the bolt only causes the bolt to rotate within the wire bristles. These and other advantages of the present invention may be seen from the detailed description and accompanying drawings contained herein.

Accordingly, it is an object of the present invention to provide a low cost, highly efficient means of fastening a bolt to a nut or to other external objects which is automatically aligned, regardless of its initial position, which automatically contours the interior of the nut to the threading on the bolt. It is a further object to provide a nut which allows the bolt to continue to rotate in place without descending when external threading resistance is met. It is an additional object of the present invention to provide a fastener which may be used for retaining a bolt in a desired position for later descent into a second nut or a threaded aperture.

It is the further object of the present invention to provide a means for holding one or more bolts in a first position and allowing quick and easy insertion of the bolt into a second position in an aperture or nut.

DETAILED DESCRIPTION OF THE PREFERRED EMBODIMENT

Figure 1:
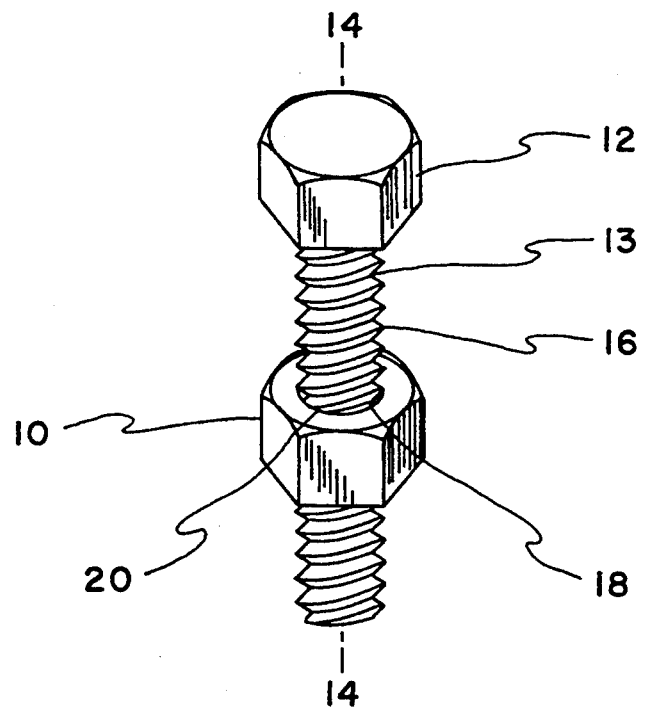
FIG. 1 of the drawings is a front perspective view of a conventional nut and bolt as known in the prior art.

While the invention is susceptible of embodiment in many different forms, there is shown in the drawings and will here be described in detail several specific embodiments with the understanding that the invention is not limited thereto except insofar as those who have the disclosure before them are able to make modifications and variations therein without departing from the scope of the invention.

As shown in FIG. 1 of the drawings, a conventional nut 10 has a bolt 12 extending therethrough. Helically arrayed along the longitudinal axis 14 of bolt 12 is spiral threading 16, as conventionally known in the art. A bore 18 extends longitudinally through nut 10. Bore 18 has a diameter larger in size than the combination of the diameter of bolt 12 and the threading 16. Nut Threading 20 is contained within bore 18 for engagement with threading 16, so as to retain bolt 12 within bore 18.

Nut 10 can descend down the shaft 11 of bolt 12 only where the nut threads 20 interlock with the bolt threads 16. When an external force, (encountered, for example, at the surface of the fixed member being bolted into) impedes nut 10's smooth rotation, the nut 10 tightens and descends at a slower pace in its rotation until it ultimately stops. While these characteristics enable an ordinary nut 10 to perform the fastening function for which it was designed, there are applications where a different type of nut would be beneficial. For Example, in certain situations, a nut may not only fasten, but may perform other functions, such as absorbing.

Figure 2:
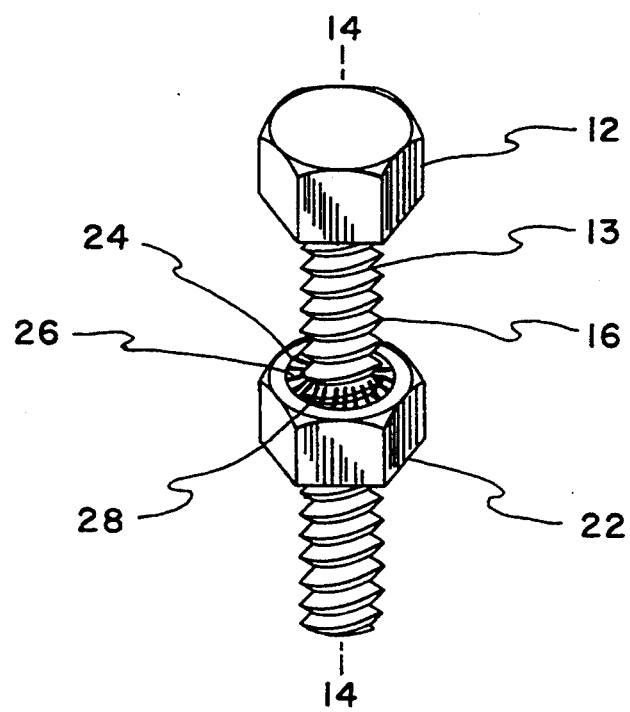
FIG. 2 of the drawings is a front perspective view of a nut and bolt of the present invention.

As shown in FIGS. 2 thru 5, a conventional bolt 12 extends through improved nut 22 of the present invention. As shown in FIG. 2, improved nut 22 has a bore 24 extending longitudinally therethrough. The diameter of bore 24 is greater than the diameter of shaft 11 of bolt 12 so that shaft 13 with helical threading 16 affects thereon can extend through bore 24. An array of wire bristle members 26 are affixed within bore 24. Wire bristle members 26 extend inwardly from the inside wall 28 of bore 24 towards the longitudinal axis 14 of bolt 12, which is coincident with the longitudinal axis of nut 22. Wire bristles 28 are constructed of a steel or plastic material which is sufficiently stiff so as to restrain a bolt 12 within bore 24. They are also sufficient in length to engage the threading 16 of bolt 12.

In one embodiment, the wire bristles 26 extend inwardly from the inside wall 28 of bore 24, a distance no greater than ½ the diameter of the bore. This length allows the shaft 13 of bolt 12 to be inserted into the bore 24. Obviously the length of the wire bristle 26 depends on the size of nut 22, the size of bore 24 and the degree of resistance required. In the preferred embodiment, wire bristles 26 are constructed of 14 mil. diameter wire so as to provide sufficient stiffness and elasticity to allow threading of bolt 12 and threading 16 onto the wire bristles 26. At the same time, the wire bristles 26 are sufficiently rigid to selectively retain nut member 22 on bolt 12. The wire bristles 26 are preferably constructed of 300 series stainless steel wire having a modulus of elasticity of 29 million. In a preferred embodiment, the helical threading 16 on shaft 11 of bolt 12 has a pitch of between 4 and 16 per inch so as to insure ease of threading through wire bristles 26, while at the same time causing resistance to passage of bolt 12, so as to retain bolt 12 in nut 22.

The wire bristles 26 may be attached to the bore 24 by a variety of methods. A sleeve 27 containing wire bristles 26 extending therefrom may be inserted into and attached to bore 24. In those cases where nut 22 is constructed of plastic, wire bristles 26 may be injection molded as part of the nut 22. Wire bristles 26 may also be arc welded to a metal nut 22. In any case, the resulting plurality of wire bristles extending inwardly in bore 24 forms a wire brush 29 which holds bolt 12.

Figure 6:
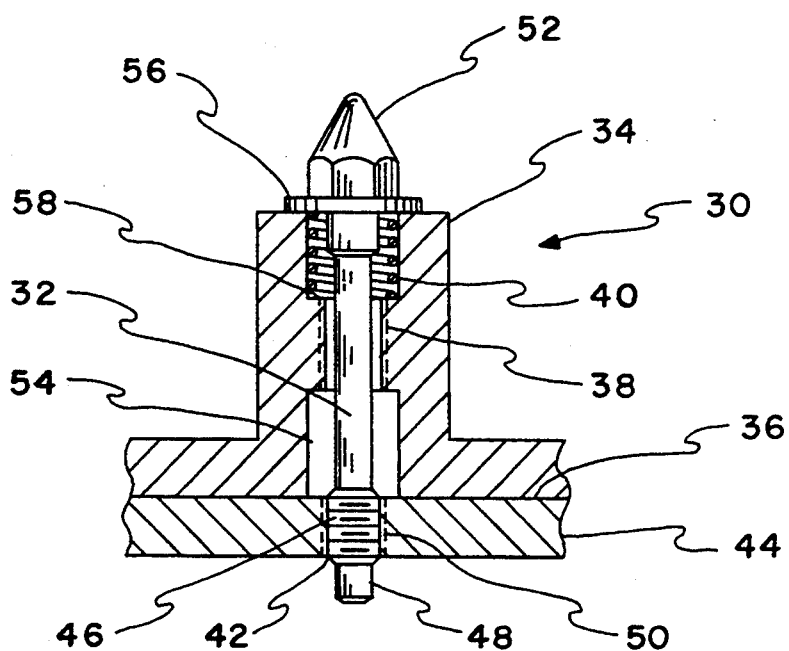
FIG. 6 of the drawings is a side cutaway view of a conventional bolt capture device as known in the prior art.
Figure 7:
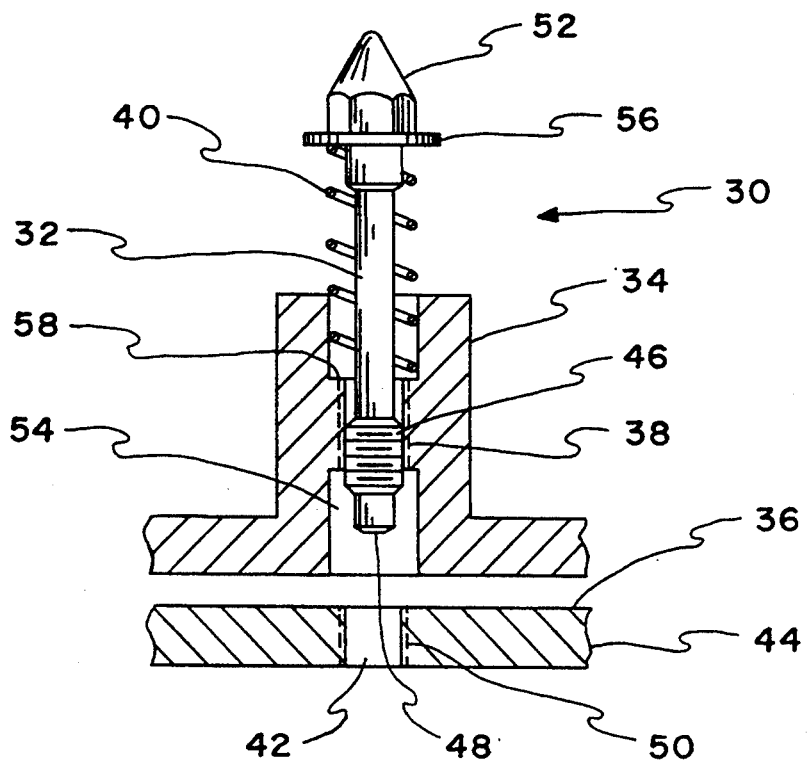
FIG. 7 is a side cutaway view of the bolt capture device of FIG. 6 showing the bolt withdrawn from the fixed member and extending from the capture device and held therein.

As shown in FIGS. 6 and 7 of the drawings, one application in which threaded bolts are conventionally used is bolt captured device 30. A bolt capture device 30 may be used, in one application, for remote assembly of heavy plant equipment in contaminated areas. Upon disassembly of the equipment, the bolt capture device 30 holds the bolt 32 in a remote member section 34 and aligns it perpendicular to the remote member surface 36, (hereafter vertically), so that refastening is easy when assembly is needed again. It should also be noted that the broken away sections shown in FIGS. 6 and 7 are part of a larger mechanism.

Internal threads 38 in the remote member portion 34 of the device 30, in combination with a light action spring 40, make bolt capture with this device possible. As the bolt 32 is removed from bore 42 in fixed member 44, the threading 46 on the distal end 48 of bolt 32 is engaged with the threading 50 within the bore of 42. When the bolt 32 is rotated on the cone head 52 sufficiently so as to disengage threading 50 from the threading 46 of bore 42, the light action spring 40 causes the bolt 32 to "spring" upwardly into the bore 54 of the bolt capture device 30. This is accomplished by means of spring 40 shown in FIG. 6. Spring 40 is compressed between shoulder 58 within bore 54 at one end of the spring 40 and a washer 56 at the other end of the spring 40. The spring 40 is held compressed because distal end 48 of bolt 32 is held in place by the threading of 46 on bolt 32 being engaged with the threading the internal threads 38 of fixed member 44. When the threading 46 is disengaged, spring 40 causes bolt 32 to more upwardly until the threading 46 comes into contact with internal threading 38 of remote member 34.

While this conventional remote fastening device is effective and clever, it is also unnecessarily complicated and costly. Rather than having a straight cylindrical hole 54 through the remote member portion 34 of the device 30, it has a hole 54 with three different diameters. Threads 38 inside the hole 54 are difficult to make and must be bored with the utmost precision.

Figure 8:
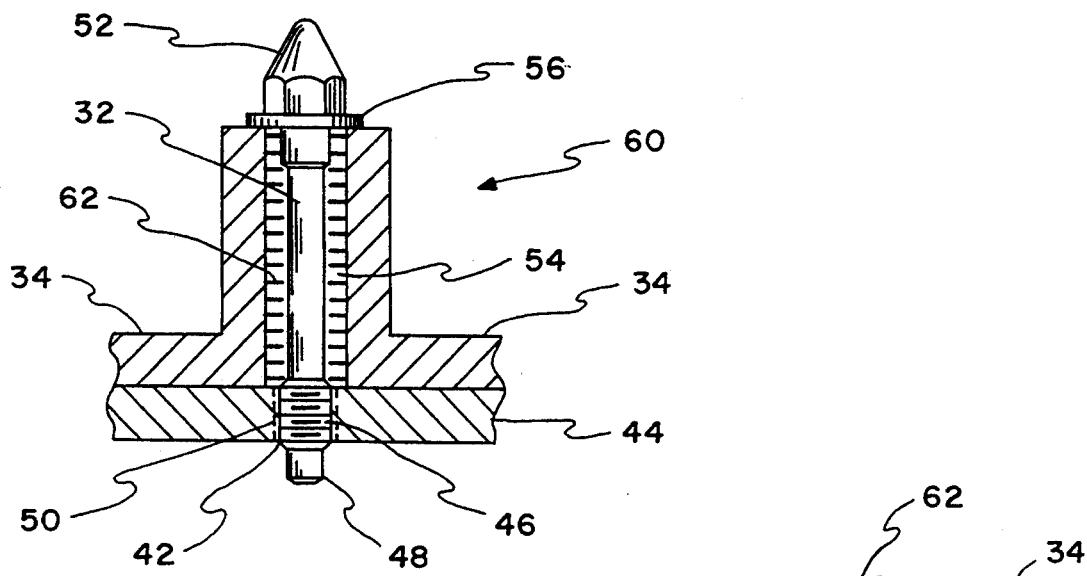
FIG. 8 of the drawings is a side cutaway view of the bolt capture device of the present invention showing in particular wire bristles used to retain the bolt in the capture device.
Figure 9:
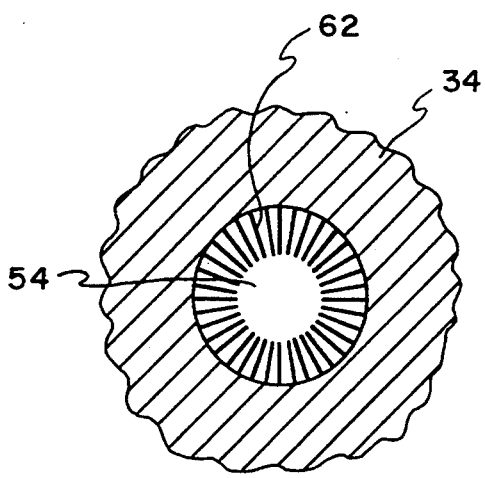
FIG. 9 of the drawings is a side cutaway view of the capture device of FIG. 8 showing in particular the bolt in an extended position from the capture device and withdrawn from the fixed member.
Figure 10:
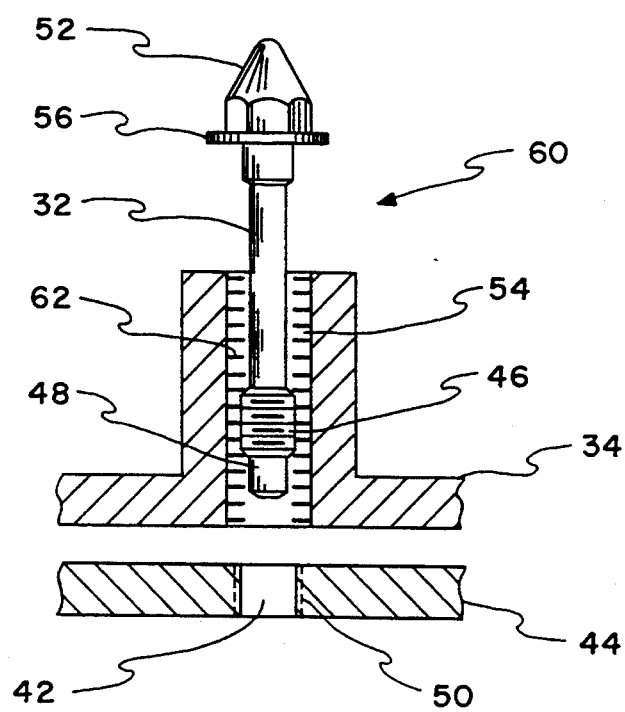
FIG. 10 of the drawings is a side cutaway view of the capture device of FIGS. 8 and 9 showing in particular the wire bristles mounted within the capture device.

As shown in FIGS. 8, 9 and 10, a bolt capturing device 60 of the present invention is disclosed. Again, a bolt 32 is disclosed which is contained within the remote member section 34. A fixed member 44 has a bore 42 extending therethrough with a threading 46 contained therein. However, in the present invention, the bore 54 of the remote member has a plurality of wire brush bristles 62 pointed inwardly. These wire brush bristles 62 enable the fastening bolt 32 to be threaded through the remote member 34 in the same fashion as if ordinary threads 38 (FIG. 6) were bored through the length of the remote member 34. The threading action of the bolt 32 moving through the wire bristles 62 is essentially the same as that of a bolt 32 moving through ordinary nut threads 38, thus insuring a smooth vertical entry of the fastening bolt 32 into the threads 46 of the fixed member 44.

There are important functional differences, however, between wire bristles 62 and ordinary nut threads 38. First, wire bristles 62 enable a rotating bolt 32 to self contour; the wire bristles 62 align themselves with the threading 46 of the bolt 32. Whereas ordinary nut threads 38 allow descent of a rotating bolt 32 only at the point where the nut threads 38 and bolt threads 46 are aligned, wire bristles 62 allow descent of a bolt 32 at any point, along any path in the bore 54 and as soon as the bolt 32 is rotated. Second, bristles 62 which make up wire brush 62 are flexible and give when faced with resistance. When a force impedes the smooth progress of a rotating bolt 32, wire bristles 62 slide over the bolt threads 46 and the bolt 32 will tend to rotate in place while descending.

As a bolt 32 moves through the remote member portion 34 of the fastening device 60 disclosed herein, it threads through the wire bristles 62 as it would through ordinary nut threads 38. Then, as the bolt 32 meets the threading 46 of fixed member 44, the bolt 32 stops descending momentarily and rotates in place, with the wire bristles 62 sliding over the threads 46, until its threads 46 align themselves with the threads 50 of the fixed member 44. When threads 46 mesh with threads 50 of the fixed member 38, the bolt 32 adopts a threading path through the remote member 34 different from its previous path. In order to remove the bolt 32, it is simply rotated in conventional manner upwardly through the wire bristles 62 until a desired position is reached where the bolt 32 is held in place by the threading 46 engaging with the wire bristles in the bore 54 of the remote member 34.

The wire bristle device 60 provides excellent capture. Since it allows self-contouring, it enables the smooth removal of the bolt 32 from the fixed member 44. Since in the absence of resistance, it acts like an ordinary nut 12, it holds the bolt 32 in a vertical position, primed for refastening, when removed as shown in FIG. 9.

Again, the wire bristles are affixed to and extend radially within the bore 54 of the remote member 34. The wire bristles 62 are constructed of a gauge sufficient to guide the bolt 32 within the bore 54 and to selectively retain the bolt 32 within the apparatus 30 as required. The wire bristles preferably are no greater than one-half the diameter of the bore 54.

Figure 11:
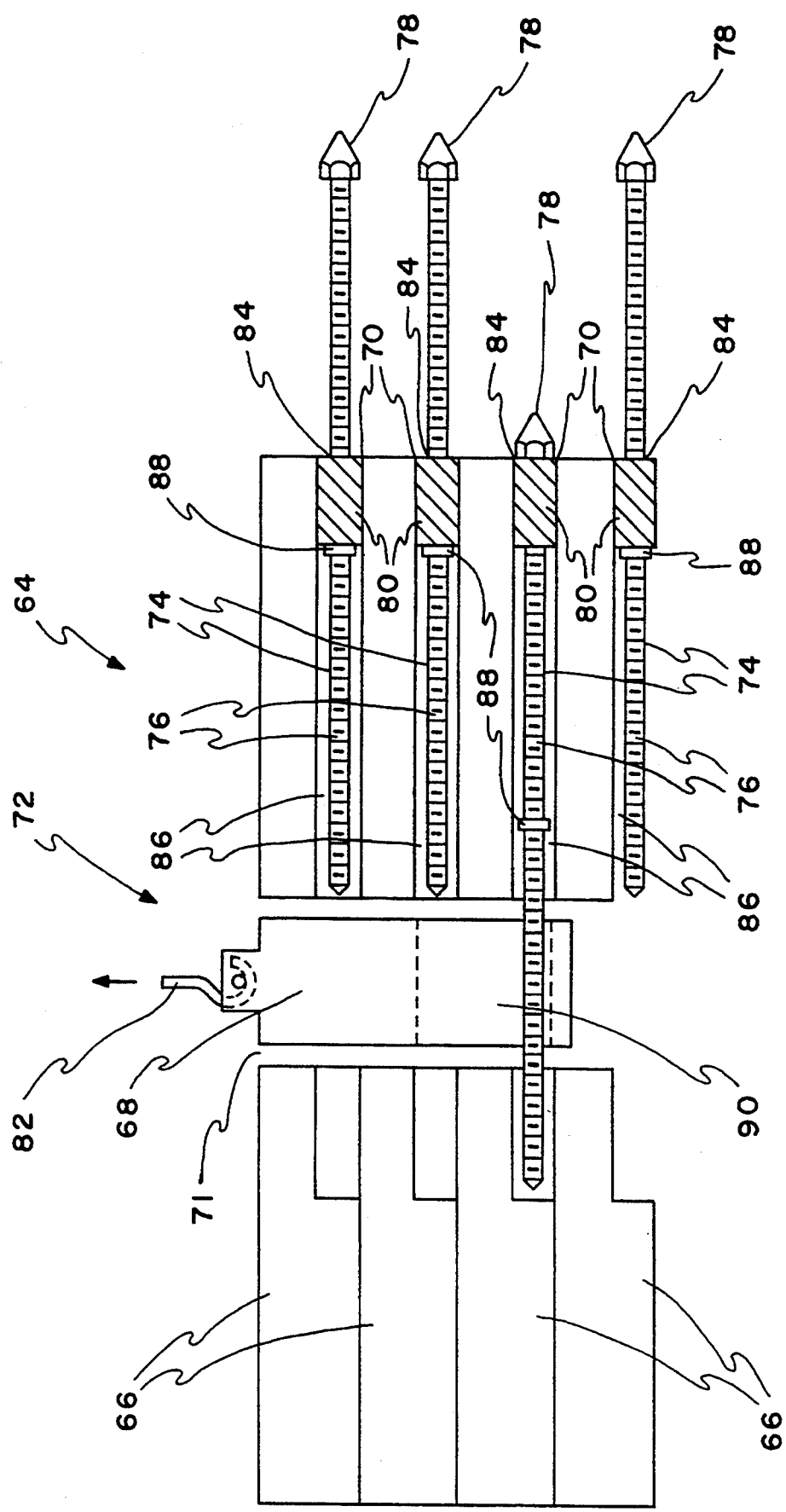
FIG. 11 of the drawings is a side view, partially broken away, of a test rig device having selectively insertable bolts extending through wire brush nuts.
Figure 13:
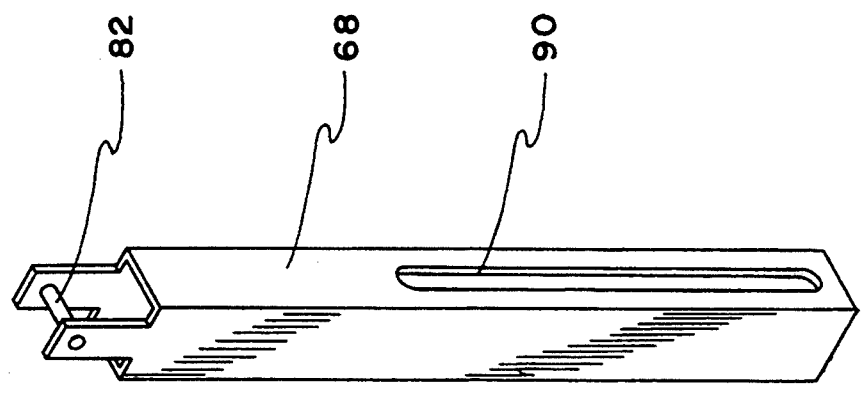
FIG. 13 of the drawings is a front prospective view of the lifter beam of the load test rig of FIG. 11.
Figure 12:
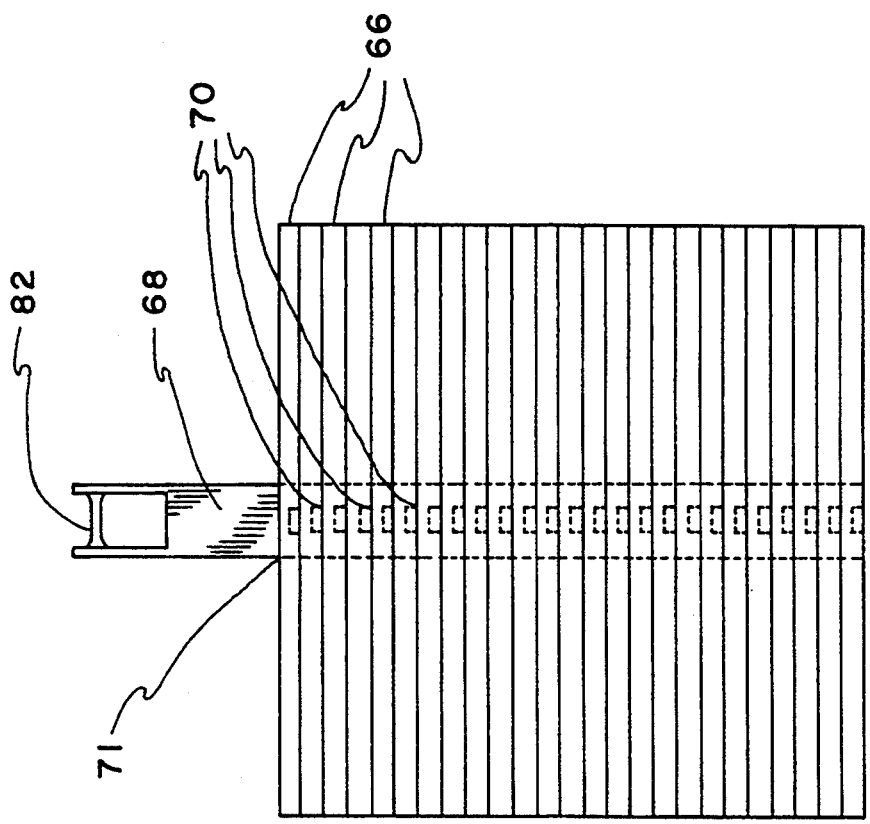
FIG. 12 of the drawings is a front view of the load test rig of FIG. 11.

As shown in FIGS. 11, 12 and 13 of the drawings another application of the present invention is shown. In this application, a load test device 64 is provided for exerting a selected weight against a mechanical device such as a crane. In the embodiment shown, the device 64 is used in radioactively contaminated areas. The apparatus 64 consists of 25 one-ton steel plates 66 stacked one on top of each other. A lifter beam 68, fits through holes 71 at the center 72 of the stacked plates 66. One bolt pin 74 may be slid under a particular plate 66. Depending on the desired load, a pin 74 is selected to capture the desired number of plates 66. The pin 74 interlocks with the lifter beam 68. The pin 74 used for interlocking with the lifter beam 68 will be remotely inserted in and out from under the plates 66. They must be designed so that insertion is easy, inexpensive and damage to equipment is prevented.

Pins 74 have threading 76 helically arrayed thereon. By rotating pins 74, with a device such as an impact wrench, (not shown) engaged against the head 78 of each pin 74 the pins 74 can be selectively inserted through a wire brush nut 80 in each plate 66. When the pin 74 is inserted into the lifter beam 68, all of the plates 66 from that pin upwards will be elevated, when the lifter beam 68 is elevated. Thus when forced is supplied to the lifter beam 68 by means of a hook 82 and the lifter beam is elevated, the plates 66 which are positioned above the plate 66 having a pin 74 extending through the lifter beam 68 will be elevated.

Figure 3:
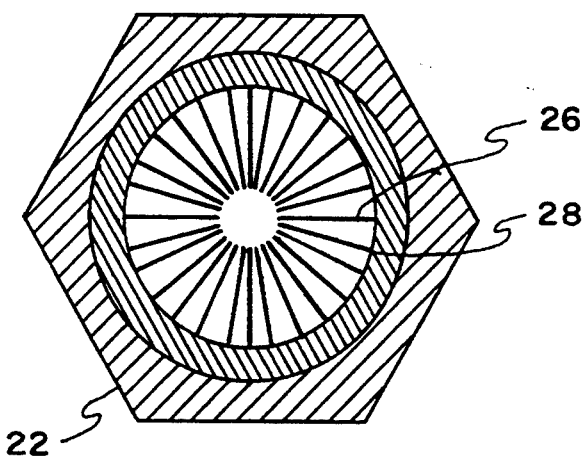
FIG. 3 of the drawings is a sectional view of the nut of FIG. 2.
Figure 4:
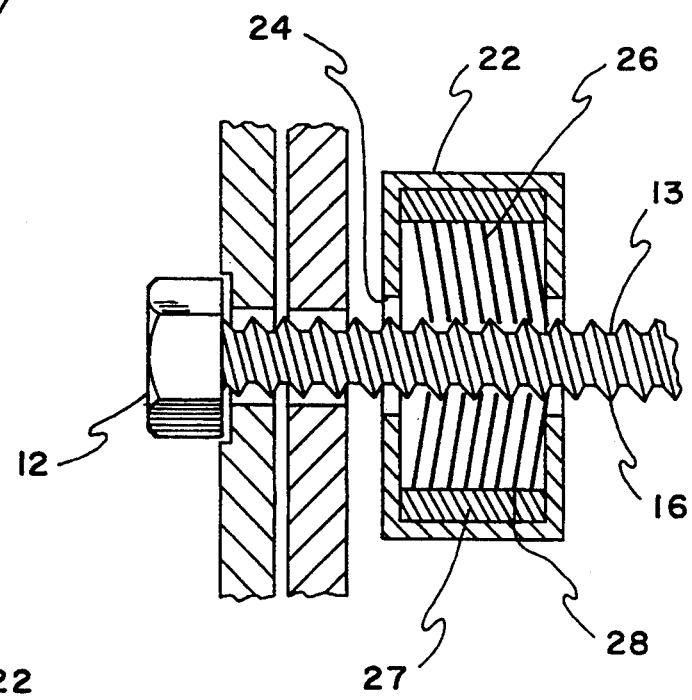
FIG. 4 of the drawings is a vertical section of the nut and bolt of FIG. 2.
Figure 5:
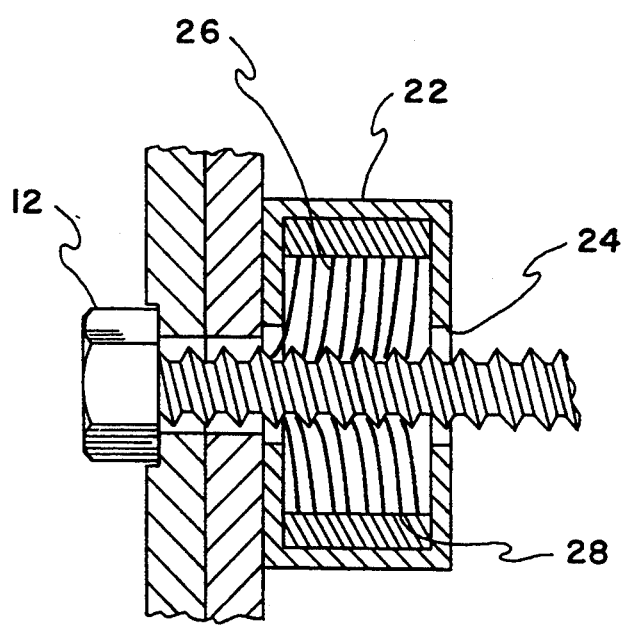
FIG. 5 of the drawings is a vertical section of the nut and bolt of FIG. 2 showing the nut tightened so as to fasten the bolt onto a main body member.

The wire brush nut 80 is of substantially the same design as the wire bristles nut 22 shown in FIGS. 3 through 5. A series of wire bristles 84 are affixed therein which engage against the threading 76 of bolt pin 74 so as to effect selective retention of the bolt pin 74 in a desired position. The wire brush nuts 80 also have external dimensions designed to fit into the bore 86 of each plate 66 and to be fixedly positioned therein. (They are approximately identical in size). Alternatively, the wire bristles can be affixed directly within the bore 86.

The wire brush nut 80 of the present invention reduces manufacturing costs, and it prevents damage to equipment. Instead of resisting movement of the bolt pins 74 rotated by an impact wrench (not shown), the wire brush nut 80 absorbs the wrench's force. When either the bolt head 78 (upon insertion) meets the wire brush nut 80 or the stopper 88 at the end of the bolt threads 76 (upon retrieval) meets the wire brush nut 80, instead of tightening, the wire brush nuts 80 allows for continued rotation of bolt 74. The bristles 84 of the wire brush nut 80 slide over the threads 76 of the bolt 74, and the force exerted by the wrench (not shown) continues to turn the bolt 74 rather than imparting force onto the nut 80. Force absorption provided by the wire brush nut 80 will also prevent equipment damage if for some reason upon insertion of pin 74 into the lifter beam slot 90 is not properly aligned. When an ordinary nut such as nut 10 in FIG. 1 is used in such a situation, the bolt 12 imparts a force on the lifter beam 68, after tightening. The present wire brush nut 80 allows the bolt 74 to rotate in place until the bolt 74 is properly aligned for insertion.

Although, in a preferred embodiment, the wire bristles 84 are constructed of steel wire, in alternative embodiments, the wire bristles and/or the wire brush nut can be constructed of injection molded plastic having sufficient stiffness to provide the desired rigidity and sufficient flexibility. A wide variety of engineering plastics such as polypropelene, acrylic, polycarbonate, polyester, and other well known engineering plastics can be used.

The foregoing description of the preferred embodiment of the invention has been presented for purposes of illustration and description. It is not intended to be exhaustive or to limit the invention to the precise form disclosed, and obviously many modifications and variations are possible in light of the above teaching.

I claim as my invention:

1. A fastening device for attaching a remote member to a fixed member, said device comprising:
    a threaded bolt;
    a longitudinal bore through said remote member, said longitudinal bore is of greater diameter than said threaded bolt and is axially aligned with said threaded bore;
    a plurality of wire bristle members affixed to and extending radially inward from said longitudinal bore, said bristle members being constructed and adapted to engage the threads of said bolt and to thereby retain said bolt within said remote member and to guide said bolt into alignment with said fixed member and, a threaded bore within said fixed member threadly receiving said bolt while said bolt is also within said longitudinal bore.

2. The fastening device of claim 1 wherein said plurality of wire bristles extend inwardly from said longitudinal bore and end at a distance of no greater than half the diameter of said bore.

3. The fastening device of claim 1 wherein said plurality of wire bristles are constructed of a stainless steel wire so as to provide sufficient elasticity to allow threading of said bolt onto said wire bristles, but at the same time are sufficiently rigid to selectively retain said bolt member in the remote member.

4. The fastening device of claim 3 wherein the wire bristles guide the bolt member through the remote member and onto a fixed member without contact with the fixed member.

5. The fastening device of claim 1 wherein said wire bristles are constructed of 300 series steel wire having a modulus of elasticity of 29 million.

6. The fastening device of claim 1 wherein the threads of said bolt have a pitch of between 4 to 16 per inch so as to insure ease of threading through said wire bristles and at the same time sufficient resistance to passage of said bolt so as to retain said bolt in said remote member.

7. The apparatus of claim 1 wherein said wire bristles are effective to absorb force exerted on said bolt member when said bolt member is fully extended into said bore.

8. A load test apparatus with means for retaining bolt members, said apparatus comprising:
    a lifter beam having a longitudinal slot extending therethrough; said lifter beam connected to means for elevating and lowering said lifter beam;
    a body member comprising a plurality of test rig plates disposed in parallel, each plate having a longitudinal bore enclosing a nut with a longitudinal bore and plurality of wire bristle members being affixed to and extending inwardly from said nut bore, said bristle members being constructed and arranged to guide one of said bolt members within said bore and to selectively retain said bolt member; and with at least one of said bolt members extensible from each of said test rig plates, said lifter beam being positioned through said test rig plates so that when said bolt member is threaded into and through said longitudinal bore, said bolt member extends to engage said slot in said lifter beam whereby a selected number of said test rig plates are attached to said lifter beam thereby raising said test rig plates, as said lifter beam is raised.

9. The apparatus of claim 8 wherein said plurality of wire bristle members extend radially inwardly from said nut bore toward the longitudinal axis of said nut bore and said bristle members have a length of approximately one half the radius of said nut bore minus one half the root diameter of said bolt member.

10. The apparatus of claim 8 wherein said plurality of wire bristles extend inwardly from said nut bore and end at a distance of no greater than half the diameter of said nut bore.

11. The apparatus of claim 8 wherein said plurality of wire bristles are constructed of 14 mil diameter wire so as to provide the sufficient stiffness and elasticity to allow threading of said bolt onto said wire bristles, but at the same time are sufficiently rigid to selectively retain said nut member on said bolt member.

12. The apparatus of claim 8 wherein said wire bristles are constructed of 300 series stainless steel wire.

13. The apparatus of claim 8 wherein the threads of said bolt have a pitch selected from the range of between 4 and 16 per inch so as to insure ease of threading through said wire bristles and at the same time sufficient resistance to passage of said bolt so as to retain said bolt in said nut.

* * * * *